United States Patent [19]
Kobald

[11] 3,724,609
[45] Apr. 3, 1973

[54] HYDRAULIC BRAKING APPARATUS

[75] Inventor: Walter Kobald, Stutgart-Feuerbach, Germany

[73] Assignee: Robert Bosch GmbH, Stuttgart, Germany

[22] Filed: Feb. 12, 1971

[21] Appl. No.: 114,907

[30] Foreign Application Priority Data

Feb. 21, 1970  Germany............P 20 08 052.8

[52] U.S. Cl. ............188/170, 188/106 P, 303/2, 303/9, 303/10, 303/13
[51] Int. Cl. ............................................B60t 13/14
[58] Field of Search.....188/170, 106 P; 303/2, 9, 10, 303/13, 68, 6

[56] References Cited

UNITED STATES PATENTS 3,090,359  5/1963  Hoppenstand....................188/170 X
3,385,636  5/1968  Cruse................................303/13 X

FOREIGN PATENTS OR APPLICATIONS 1,063,078  3/1967  Great Britain.....................188/170

Primary Examiner—Milton Buchler
Assistant Examiner—John J. McLaughlin
Attorney—Michael S. Striker

[57] ABSTRACT

A hydraulic brake is operated by a piston located in a brake cylinder. Pressure fluid from a pump is supplied through two conduits to two chambers formed by the piston in the brake cylinder, and each conduit has an adjustable pressure limiting valve and a variable throttle operated simultaneously by a linkage connected with the brake pedal so that the pressures in the cylinder chambers are varied. The force resulting from the pressure differential between the chambers acts in one direction on the piston for releasing the brake, and in the opposite direction for actuating the brake.

9 Claims, 1 Drawing Figure

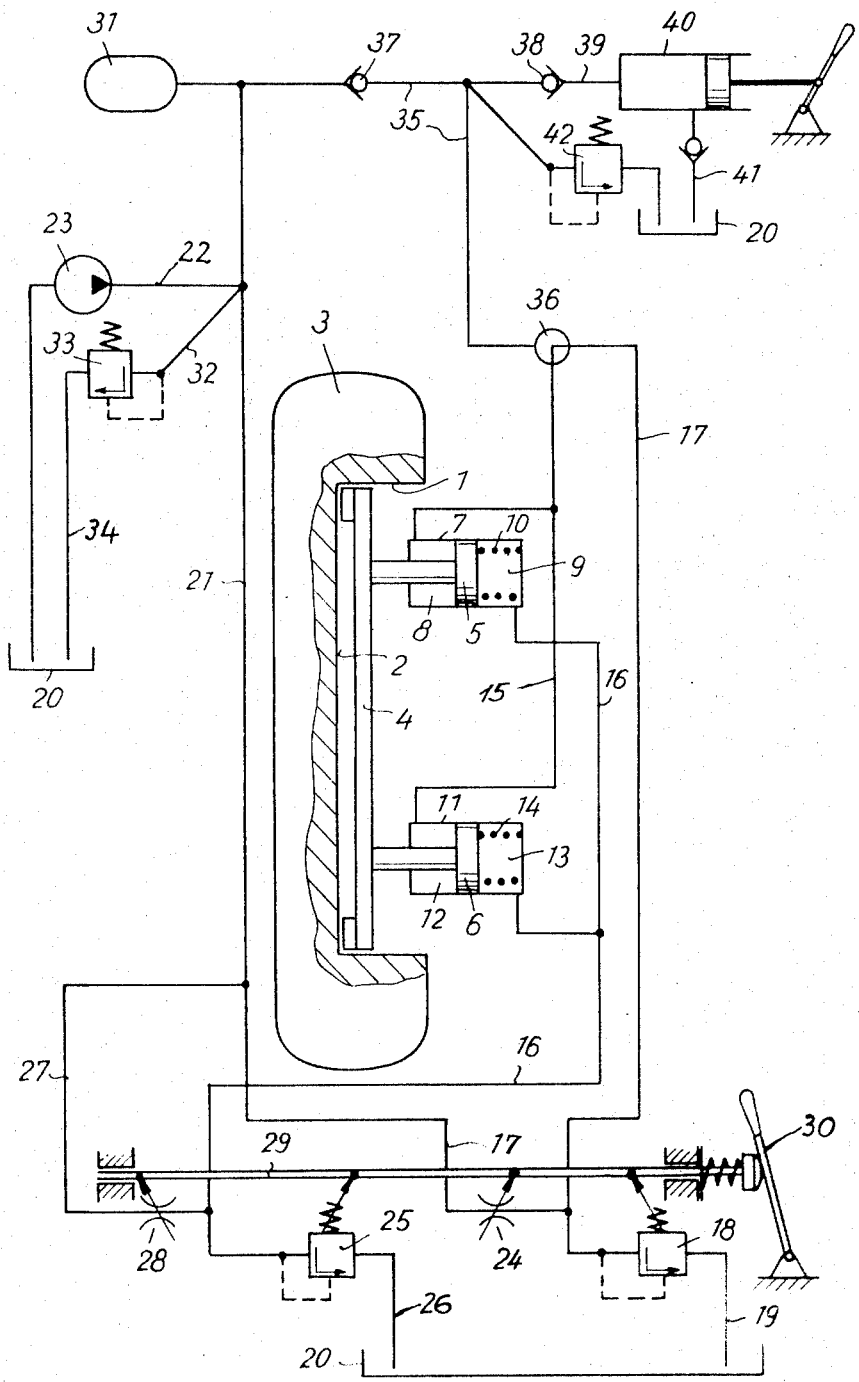

3,724,609

HYDRAULIC BRAKING APPARATUS

BACKGROUND OF THE INVENTION

A hydraulic power brake is known in which the brake pedal operates two pressure limiting valves in such a manner that during a braking operation, the pressure of the fluid flowing to the valves is increased. The fluid flowing from the valve is supplied to a brake cylinder for operating a brake disk. The fluid is supplied only on one side of the piston, which is returned by a spring to its initial position. The prior art construction has the disadvantage that the brake can only be operated during running of the motor pump supplying the brake fluid, and it is not possible to use the brake as a parking brake when the pump does not operate.

SUMMARY OF THE INVENTION

It is one object of the invention to provide a hydraulic braking apparatus of a simple construction, which reliably operates, and is comparatively inexpensive to manufacture.

Another object of the invention is to control a brake by the pressure differential between two chambers formed in a brake cylinder by a piston.

Another object of the invention is to simultaneously increase and reduce the pressures in two chambers formed in the brake cylinder by a piston, for reversing the direction of the resultant force acting on the piston.

With these objects in view, chambers on opposite sides of a differential piston are supplied by two hydraulic control circuits with pressure fluid. In each hydraulic control circuit, an adjustable valve for regulating the pressure in the same, and a throttle with a variable flow cross section are provided. The pressure of the valve and the flow cross section of the throttle of the first hydraulic control circuit are varied upon operation of the brake pedal in a reverse ratio as compared with the pressure of the valve and the flow cross section of the throttle in the second hydraulic control circuit. Preferably, a spring acts on the differential piston for urging the same to a position in which the brake is operated.

One embodiment of the invention comprises at least one brake cylinder member, and a piston member forming in the cylinder member a releasing chamber and a braking chamber, one of the members, preferably the piston member, being movable relative to the other and connected with brake means for operating the same between a normal released position and a braking position; first and second conduit means connecting the source of pressure fluid, preferably a motor pump with the releasing and braking chambers, respectively; first and second pressure adjusting valves in the first and second conduit means, respectively, having normal positions in which the pressure in the first conduit means and in the releasing chamber is higher than the pressure in the second conduit means and in the braking chamber so that the movable piston member holds the brake means in a normal released position, and having operative positions in which the pressure in the second conduit means and in the braking chamber is higher than the pressure in the first conduit means and in the releasing chamber so that the movable piston member moves the brake means to the braking position; and operator controlled brake actuating means connected with the first and second pressure adjusting valve means and having a normal position for holding the first and second pressure adjusting valve means in the normal positions, and an actuated position for moving the first and second pressure adjusting valve means to the operative positions so that the brake means is moved between the normal and braking positions by the pressure differential between the releasing and braking chambers.

Preferably, the first and second conduit means include first and second variable throttling means, respectively, operated by the brake actuating means to increase and reduce the flow cross sections of the first and second conduit means when the operation of the pressure adjusting valves the pressure in the respective conduit means is increased and reduced, respectively.

In the preferred embodiment, a spring is located in the braking chamber abutting the piston member and the urging the same to move to a position in which the brake is operative. This may occur when the motor pump supplying pressure fluid to the conduits fails, and therefore it is advantageous to provide a manually operated pump connected with the releasing chamber for moving the piston to a position in which the brake is released. Check valve means are provided for separating the manually operated pump from the motor pump.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE of the drawing is a schematic and a diagrammatic view, partially in section, and illustrating an embodiment of the invention.

DESCRIPTION OF THE PREFERRED EMBODIMENT

A wheel 3, which may be one of four wheels of a motor car, has an inner cavity 1 with a brake surface 2. A brake disk 4 is movable in the cavity 1 between a position abutting the brake surface 2, and a position spaced from the same. In the illustrated embodiment, two stationary brake cylinders 7 and 11 are provided. Pistons 5 and 6 are located in brake cylinders 7 and 11, and have piston rods fixedly connected with the brake disk 4. Piston 5 forms a braking chamber 9 and a releasing chamber 8 in cylinder 7, and piston 6 forms a braking chamber 13 and a releasing chamber 12 in cylinder 11. Springs 10 and 14 are respectively located in braking chambers 9 and 13, and urge pistons 5 and 6 to move brake disk 4 to a braking position abutting brake surface 2. A motor pump 23 pumps pressure fluid out of a container 20 and into a conduit 22 which opens into a conduit 21 connected with the pressure accumulator 31. Conduits 21 and 22 are connected by a conduit 32 with a pressure limiting valve 33 which opens against spring pressure to discharge through discharge conduit 34 into container 20 when the pressure in conduit 21 exceeds a predetermined desired pressure so that a normal pressure is maintained in conduit 21 and pressure accumulator 31. When pressure limiting valve 33 opens, pump 23 idles.

First conduit means 17,15 connect pressure conduit 21 with the two releasing chambers 8 and 12. A second conduit means 27,16 connects pressure conduit 21 with braking chambers 9 and 13. A three-way valve 36 is provided between conduits 17 and 15, and normally connects the same. Valve 36 can be turned to a position in which conduit 17 and conduit 21 are disconnected from conduit 15, and the same is connected with a conduit 35, which opens into a conduit 39. A check valve 37 separates conduit 35 from pressure accumulator 31, and a check valve 38 is provided between conduit 35 and a manually operated piston pump 40 which is connected by a check valve 41 with a container 20. A pressure limiting valve 42 is connected with conduits 39 and 35 between check valves 37 and 38, and permits discharge into container 20 when a desired pressure is exceeded upon operation of the manual pump 40.

Conduit 17 is connected with a pressure limiting spring biased valve 18 which has a discharge conduit 19 opening into container 20. A first variable throttling means 24 is provided in conduit 17.

A second pressure limiting spring biased valve 25 is connected with conduit 16 and has a discharge conduit 26 opening into container 20. A second variable throttling means 28 is provided in conduit 27 which connects pressure conduit 21 with conduit 16 and pressure limiting valve 25.

Actuating means are provided and include a brake pedal 30 acting on a linkage rod 29 which is guided in bearings for straight movement. Pressure limiting valves 18 and 25 have actuators connected with and operated by the linkage rod 29, so that the limit pressures of valves 25 and 18 are simultaneously adjusted upon operation of the brake pedal 30.

Variable throttling means 24 and 25 also have actuators connected with the linkage rod 29 so that all four actuators are simultaneously operated.

Upon operation of the brake pedal 30, the pressure limits of valves 18 and 25, and the flow cross sections of throttling means 24 and 28 are simultaneously adjusted.

When the brake pedal 30 is in a normal position in which the wheels 3 are not braked, the pressure limiting valves 18 and 25 are set to positions in which the pressure in the first conduit means 17,15 and releasing chambers 7 and 12 is greater than the pressure in the second conduit means 27,16, and in the braking chambers 9 and 13. The pressure differential between the releasing chambers 8,12 and the braking chambers 9,13 is great enough to retract pistons 5 and 6 against the action of springs 10 and 14. Pressure limiting valve 25 is adjusted to a lower pressure than pressure limiting valve 18 in this position of the brake actuating means 30,29 in which the brake means 2,4 are inoperative. In the same position of the linkage rod 29, the variable throttling means 24 and 28 are set to a position in which the flow cross section of throttling means 28 is smaller than the flow cross section of throttling means 24, which also serves to increase the pressure in the releasing chambers 8 and 12, and to reduce the pressure in the braking chambers 9 and 13.

When the brake pedal 30 is operated to actuate the brake means 4,2, linkage rod 29 is displaced, and operates the actuators of the pressure limiting valves 18 and 25, and of the variable throttling means 24,28. The spring pressure of pressure limiting valve 25 is increased, which corresponds to a higher pressure in the second conduit means 27,16, and at the same time, the flow cross section of the variable throttling means 28 is increased. An opposite adjustment is carried out with pressure limiting valve 18 which is set to a reduced pressure, while the flow cross section of the variable throttling means 24 is reduced. These measures cause an increase of the pressure in the braking chambers 9 and 13, and a reduction of the pressure in the releasing chambers 8 and 12. Consequently, differential pressures acting on pistons 5 and 6, together with springs 10 and 14, urge the pistons 5 and 6 to move the brake disk 4 into engagement with brake surface 2.

When the brake pedal 30 and linkage rod 29 are returned by a spring to the normal position, the pressure limiting valves 18 and 25, and the variable throttling means 24 and 28, are again adjusted to produce a greater pressure in releasing chambers 8 and 12, and a smaller pressure in braking chambers 9 and 13, so that brake disk 4 is retracted.

In the event pump 23 fails, or is not driven, springs 10 and 14 move brake disk 4 with a comparatively small force into engagement with brake surface 2. To release the brake means 4,2, three-way valve 36 is turned so that conduit 17 is disconnected from conduit 15 and releasing chambers 8 and 12, and conduit 15 and releasing chambers 8 and 12 are connected by conduit 35 and check valve 38 with pump 40. When pump 40 is manually operated, fluid is pressed through check valve 38 and conduit 39 into conduit 35 and through valve 36 into conduit 15 and releasing chambers 8 and 12 to move pistons 5 and 6 against the action of springs 10 and 14 to a position in which the brake disk 4 releases brake surface 2. Check valve 37 prevents the flow of fluid from manually operated pump 40 into pressure accumulator 31.

When pressure regulating valve 33 is operated to reduce the pressure in conduit 21, in the first conduit means 17,15, and in the second conduit means 27,16, the pressure in the releasing chambers 8 and 12 is reduced until the brake disk 24 is pressed against the brake surface 2 so that the wheel 3 is blocked, irrespective of the brake pedal 30 which may be in its normal inoperative position.

It will be understood that each of the elements described above, or two or more together, may also find a useful application in other types of braking apparatus differing from the types described above.

While the invention has been illustrated and described as embodied in a hydraulic braking apparatus with a fluid operated differential piston, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Hydraulic braking apparatus comprising brake means; at least one brake cylinder member, and a piston member in said cylinder member forming in the same a releasing chamber and a braking chamber, one of said members being movable relative to the other member and connected with said brake means for operating the same between a normal release position and a braking position; a source of pressure fluid; first and second conduit means connecting said source with said releasing and braking chambers, respectively, said first and second conduit means including first and second variable throttling means, respectively; first and second pressure adjusting valve means in said first and second conduit means, respectively, having normal positions in which the pressure in said first conduit means and in said releasing chamber is higher than the pressure in said second conduit means and in said braking chamber so that said movable member holds said brake means in said normal released position, and having operative positions in which the pressure in said second conduit means and in said braking chamber is higher than the pressure in said first conduit means and in said releasing chamber so that said movable member moves said brake means to said braking position; and operator controlled brake actuating means connected with said first and second pressure adjusting valve means and having a normal position for holding said first and second pressure adjusting valve means in said normal positions, and an actuated position for moving said first and second pressure adjusting valve means to said operative positions so that said brake means is moved between said normal and braking positions by the pressure differential between said releasing and braking chambers, said brake actuating means operating said first and second variable throttling means to increase and reduce the flow cross-sections of said first and second conduit means when by operation of said valve means, the pressure in the respective conduit means is increased and reduced, respectively.

2. Hydraulic braking apparatus as claimed in claim 1 and wherein said brake actuating means are connected with said first and second variable throttling means for varying the flow cross section of the same simultaneously with the operation of said first and second pressure adjusting valve means so that in said normal position of said brake actuating means the flow cross section of said first throttling means is greater than the flow cross section of said second throttling means, and so that in said actuated position of said brake actuating means the flow cross section of said second throttling means is greater than the flow cross section of said first throttling means.

3. Hydraulic braking apparatus as claimed in claim 1 including spring means acting on said movable member to urge the same to move said brake means to said braking position; and wherein the combined spring pressure, and fluid pressure in said braking chamber is less than the fluid pressure in said releasing chamber when said brake actuating means is in said normal position.

4. Hydraulic braking apparatus as claimed in claim 3 wherein said spring means is located in said braking chamber abutting said cylinder member and piston member.

5. Hydraulic braking apparatus as claimed in claim 4 wherein said cylinder member is stationary and said piston member is movably mounted in said cylinder member and constitutes said movable member.

6. Hydraulic braking apparatus as claimed in claim 1 including spring means located in said braking chamber abutting said piston member and said cylinder member for urging said piston member to move said brake means to said braking position; wherein said piston member is said movable member and connected with said brake means; wherein the combined spring pressure and fluid pressure in said braking chamber is less than the fluid pressure in said releasing chamber when said brake actuating means is in said normal position; and wherein said brake actuating means include a brake pedal and a linkage connecting said brake pedal with said first and second pressure adjusting valve means and with said first and second variable throttling means.

7. Hydraulic braking apparatus as claimed in claim 1, wherein said brake means include a wheel having a cavity with a brake surface, and a brake disk cooperating with said brake surface in said braking position of said brake means and being located in said cavity; said brake disk being connected with said movable member.

8. Hydraulic braking apparatus comprising brake means; at least one braking cylinder member, and a piston member in said cylinder member forming in the same a releasing chamber and a braking chamber, one of said members being movable relative to the other member and connected with said brake means for operating the same between a normal released position and a braking position; spring means urging said brake means to move to said braking position; a source of pressure fluid including a motor pump connected with said first and second conduit means, and a manually operated pump connected with said releasing chamber for moving said movable member to move said brake means to said normal released position when said motor pump fails; check valve means for separating said manually operated pump from said motor pump; first and second conduit means connecting said source with said releasing and braking chambers, respectively, first and second pressure adjusting valve means in said first and second conduit means, respectively, having normal positions in which the pressure in said first conduit means and in said releasing chamber is higher than the pressure in said second conduit means and in said braking chamber so that said movable member holds said brake means in said normal released position, and having operative positions in which the pressure in said second conduit means and in said braking chamber is higher than the pressure in said first conduit means and in said releasing chamber so that said movable member moves said brake means to said braking position; and operator controlled brake actuating means connected with said first and second pressure adjusting valve means and having a normal position for holding said first and second pressure adjusting valve means in said normal positions, and an actuated position for moving said first and second pressure adjusting valve means to said operative positions so that said brake means is moved between said normal and braking positions by the pressure differential between said releasing and braking chambers.

9. Hydraulic braking apparatus comprising brake means; at least one brake cylinder member, and a piston member in said cylinder member forming in the same a releasing chamber and a braking chamber, one of said members being movable relative to the other member and connected with said brake means for operating the same between a normal released position and a braking position; a source of pressure fluid; first and second conduit means connecting said source with said releasing and braking chambers, respectively; first and second pressure adjusting valve means in said first and second conduit means, respectively, having normal positions in which the pressure in said first conduit means and in said releasing chamber is higher than the pressure in said second conduit means and in said braking chamber so that said movable member holds said brake means in said normal released position, and having operative positions in which the pressure in said second conduit means and in said braking chamber is higher than the pressure in said first conduit means and in said releasing chamber so that said movable member moves said brake means to said braking position, said first and second pressure adjusting valve means being first and second pressure limiting valves having first and second spring biased valve members, respectively, and first and second actuators for adjusting the spring tension and thereby the pressure limits of said first and second valve members, said first and second actuators being connected with said brake actuating means and operated by the same to vary the pressure maintained in said first and second pressure limiting valve means and in said first and second conduit means, respectively; and operator controlled brake actuating means connected with said first and second pressure adjusting valve means and having a normal position for holding said first and second pressure adjusting valve means in said normal positions, and an actuated position for moving said first and second pressure adjusting value means to said operative positions so that said brake means is moved between said normal and braking positions by the pressure differential between said releasing and braking chambers.

* * * * *